Nov. 6, 1962     KATSUAKI HIRANO ETAL     3,061,884
METHOD OF MANUFACTURING POLYVINYL ALCOHOL FILMS
Filed Aug. 12, 1959
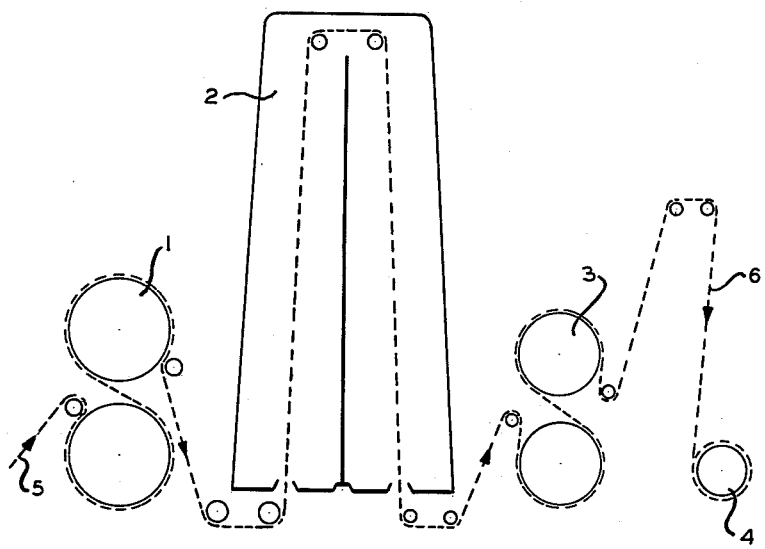
INVENTORS
KATSUAKI HIRANO
MASARU TAKADA
SABURO KAWAMURA
HIDEO SUZUMURA
KOICHI NAGANO
BY William C. Long
ATTORNEY 3,061,884
METHOD OF MANUFACTURING POLYVINYL
ALCOHOL FILMS
Katsuaki Hirano, Masaru Takada, Saburo Kawamura, and Hideo Suzumura, Okayama-ken, and Koichi Nagano, Osaka-fu, Japan, assignors to Kurashiki Rayon Co., Ltd., Okayama, Japan, a corporation of Japan
Filed Aug. 12, 1959, Ser. No. 833,199
Claims priority, application Japan Aug. 12, 1958
1 Claim. (Cl. 18—48)

This invention relates to a method of manufacturing thin films of polyvinyl alcohol. More particularly this invention pertains to a novel method of producing polyvinyl alcohol films having superior properties for packaging purposes.

In order to moisture-proof shaped products of polyvinyl alcohol, for example, fibers, mouldings and films, these articles are customarily subjected to heat treating processes at a high temperature, which process is believed to crystallize the polyvinyl alcohol. These processes are well-known and very effective. Thin films of polyvinyl alcohol, however, become fragile immediately after such a heat treatment at a high temperature and accordingly are not serviceable for packaging purposes.

A principal object of this invention is to provide a novel method of manufacturing thin films of polyvinyl alcohol which will have improved softness and tear resistance so as to be serviceable for packaging purposes.

Other objects and a fuller understanding of the invention may be had by referring to the following description, together with the accompanying drawing, in which forms of the apparatus and the operation of the process have been set forth for purposes of illustration.

Referring now to the attached drawing, which is a longitudinal cross-section through an apparatus for carrying out the present invention, Part 1 shows heat treatment rolls. Part 2 represents a humidity conditioning tank. Part 3 shows smoothing rolls. Part 4 is a take-up roll for winding up the processed polyvinyl alcohol films. Part 5 refers to a guide for feeding the polyvinyl alcohol films around rollers 1. Part 6 shows a track where the thin films may be viewed for sorting out any defective films before winding up the finished products on take-up roll 4.

For operating the process the thin films of polyvinyl alcohol are heat treated by passing around heat treating rolls 1 and then humidity conditioned by passing through humidity conditioning tank 2 which is arranged in sequence following the heat treatment rolls. The films are then smoothed by passing around smoothing rolls 3. Any defective films are sorted out at part 6 and the finished products are wound up on take-up rolls 4.

The film is passed around each roll of a pair of heat treating rolls which turn in opposite directions, in such a manner that one side of the film is heat treated by one member of the pair and the other side of the film is heat treated by the second member of the pair, as shown in the attached drawing. Supplemental guide rolls are placed adjacent to each heat treating roll to insure contact of the film with the heat treating roll for the greater part of its surface area. In this manner both sides of the thin films may be uniformly heat-treated on the surface of the rolls for a short period of time.

When the thin films are heat treated with the use of such rolls, both sides of the films are subjected to treatment under conditions such that the films adhere closely to the surface of the rolls, and shrinking of the thin films due to drying during the heat treatment can be controlled. Furthermore, the thin films can be heat-treated under strain both longitudinally and laterally, thereby giving no directional effect to the thin films; yet the strength of the films will be increased as a result of the heat treatment. The purpose of heat-treatment by the use of rolls is to accomplish these objectives. If an attempt is made to heat-treat thin films of polyvinyl alcohol, not on the surface of rolls but under a tensioned state without any support, the industrial production of the thin films becomes practically impossible because the thin films are softened at heat treatment temperatures approximately at the melting point of polyvinyl alcohol, thereby making the operation difficult.

The temperature of the heat-treatment rolls is maintained at 150° C. to 210° C. and the heat treatment is carried out for a short period, e.g. 10 seconds up to 120 seconds, in order to obtain the desired results.

If the temperature of the heat treatment is below 150° C., the moisture-proofing of the thin films will not be satisfactory. In this case the films will undergo considerable swelling under conditions of high humidity, and thus the films become unsuitable for general use in packagings. Since thin films to be used during the winter season are made by adding a large amount of plasticizer, it is preferable to maintain the temperature of heat-treatment as low as possible and to continue the heat-treatment for only a short period of time in order to avoid loss of the plasticizer.

If the temperature of the heat-treatment is raised higher than the melting point of the polyvinyl alcohol, the thin film may soften and adhere to the surface of the roll. Accordingly, heat-treatment temperatures above about 210° C. should be avoided even where the films are manufactured for the summer season and do not contain large amounts of plasticizer.

The water content of the thin films immediately after heat treatment is less than 1%. Due to the low moisture content, the thin films are fragile and it is impossible to use such films for general packaging purposes. It takes more than 40 hours for the thin films to absorb moisture normally from the atmosphere until the water content attains a state of equilibrium, namely 5 or 6%. From an industrial point of view, the mass production of the thin films by a manufacturing process based on normal atmospheric water absorption is not practicable. In accordance with the present invention, the humidity conditioning operation described above is carried out so that the water content of the film is increased as quickly as possible after the heat treatment. An important aspect of the humidity conditioning procedure is to insure that the film absorbs moisture on both sides of the film. The humidity conditioning is accomplished by passing the film through humidity conditioning tank 2. Conditions in the tank 2 are 30° C. to 90° C. temperature and 70 to 100% relative humidity. Film residence time therein is generally about 1 to 5 minutes. As a result of the humidity conditioning step, the moisture content of the film is about 8 to 10%, slightly above the equilibrium amount.

As a result of the humidity conditioning process, the softness of the film is greatly increased and the tear strength of the film raised. However, generally substantial swelling of the film occurs producing uneven crumpled film surfaces during the moisture conditioning. Further, the film surfaces become quite adhesive, making them likely to stick together. To overcome these undesirable features of the humidity conditioning, the film is immediately subjected to a smoothing operation after the humidity conditioning. In the smoothing process the film is passed around each roll of a pair of smoothing rolls in such a manner that one side of the film is smoothed by one member of the pair and the other side of the film is smoothed by the second member of the pair, as shown in the attached drawing.

The temperature of the smoothing rolls is maintained at about 35° C. to 80° C. When the temperature of the smoothing rolls is below about 35° C., satisfactory smoothing and polishing is not obtained. When the temperature is above about 80° C., considerable drying of the films occurs, the water content of the films being lowered below the equilibrium value. This causes the thin films to roll up. Accordingly, temperatures above about 80° C. are to be avoided.

In the smoothing operation the surface unevenness arising from the humidity conditioning of the thin film is smoothed, and at the same time the water content of the thin film is adjusted approximately to the state of equilibrium, a point of about 4 to 5%. Because the water content of the surface of the thin film is reduced, the adhesiveness of the film surfaces is reduced.

This final smoothing operation imparts other desirable properties to the thin films. For example, surface polishing of the film may satisfactorily be accomplished by uniform treatment on both sides of the films performed by the use of one or more pairs of smooth rolls. Glossy, colorless, transparent and strong thin packaging films may be thus manufactured on an industrial scale.

The polyvinyl alcohol film produced is especially suitable for packaging since it is colorless, transparent, glossy and easily printed. The film has superior strength against shock as compared with viscose-cellophane film because of sufficient softness and superior plasticity. The tear strength is very high. Thin films formed with the addition of plasticizer to the polyvinyl alcohol do not become brittle and are serviceable for packagings even in the winter season.

A comparison of the polyvinyl alcohol films produced according to this invention with the conventional films of vinyl chloride, polyethylene and viscose-cellophane is shown in the following table:

TABLE I

|  | Product according to this invention | Vinyl Chloride | Polyethylene | Viscose-cellophane |
|---|---|---|---|---|
| Tensile strength, longitudinal, Kg./square mm. | 4.6 | 1.1 | 0.75 | 7.3. |
| Tensile strength, lateral, Kg./square mm. | 4.4 | 0.7 | 0.27 | 3.2. |
| Elongation, longitudinal, percent. | 115 | 145 | 134 | 17.3. |
| Elongation, lateral, percent. | 128 | 160 | 160 | 30.6. |
| Tensile strength under humid conditions, longitudinal, Kg./square mm. | 0.3 | 0.9 | 0.79 | 0.6. |
| Tensile strength under humid conditions, lateral, Kg./square mm. | 0.3 | 0.7 | 0.32 | 0.4. |
| Elongation under humid conditions, longitudinal, percent. | 190 | 150 | 160 | 22.7. |
| Elongation under humid conditions, lateral, percent. | 225 | 165 | 170 | 73.2. |
| Tear strength, longitudinal, gr./mm. | 5,295 | 2,655 | 2,897 | 178. |
| Tear strength, lateral, gr./mm. | 6,896 | 4,177 | 2,432 | 228. |
| Transparency | Excellent | poor | poor | fair. |
| Air holes | Scarce | poor | poor | Appreciable. |
| Adhesiveness due to heating. | Excellent | good | fair | Capable (humidity-proof, possible.) |

The following examples are given to illustrate our invention but are not intended to limit the invention in any way.

*Example 1*

A polyvinyl film was heat-treated on both sides on passing around heat-treatment rolls at a temperature of about 150° C., each side of the film being subjected to the heat-treatment for a period of 15 seconds. The film was then subjected to humidity conditioning for 4 minutes in a humidity conditioning tank, which was maintained at a temperature of 38° C. and a relative humidity of 92%. Immediately after the humidity conditioning both surfaces of the film were smoothed with the smoothing rolls having a temperature of 40° C., each side of the film being subjected to the smoothing operation for a period of 15 seconds. The resulting film had good cold resistance for winter use.

*Example 2*

A polyvinyl alcohol film was heat-treated on both sides on passing around heat-treatment rolls at a temperature of 150° C., each side of the film being heat-treated for a period of 20 seconds. The film was then subjected to humidity conditioning for 4 minutes in a humidity conditioning tank which was maintained at a temperature of 42° C. and a relative humidity of 96%. Immediately after the humidity conditioning both surfaces of the film were smoothed with the smoothing rolls having a temperature of 50° C., each side of the film being smoothed for a period of 20 seconds. The resulting film had good plasticity for spring and autumn use.

*Example 3*

A polyvinyl film was heat-treated on both sides on passing around heat-treatment rolls at a temperature of 180° C., each side of the film being heat-treated for a period of 30 seconds. The film was then subjected to humidity conditioning for 3 minutes in a humidity conditioning tank, which was maintained at a temperature of 50° C. and a relative humidity of 95%. Immediately after the humidity conditioning both surfaces of the film were smoothed with the smoothing rolls having a temperature of 60° C., each side of the film being smoothed for a period of 30 seconds. A packaging film with good mechanical strength and moisture resistance even in times of high humidity was obtained.

*Example 4*

A polyvinyl film containing 8% of 1,3-butanediol as a plasticizer was heat-treated on both sides on passing around heat-treatment rolls held at a temperature of 180° C., each side of the film being heat-treated for a period of 25 seconds. The film was then subjected to humidity conditioning for 2 minutes in a humidity conditioning tank, which was maintained at a temperature of 50° C. and a relative humidity of 95%. Immediately after the humidity conditioning both surfaces of the film were smoothed with the smoothing rolls having a temperature of 60° C., each side of the film being smoothed for a period of 30 seconds. A packaging film was produced which was physically strong and had excellent moisture resistance even in the winter season.

What we claim is:

The method of preparing improved polyvinyl alcohol film which comprises heat treating polyvinyl alcohol film at a temperature of from 150° C.–210° C., with said film being mechanically supported during said heat treatment, moisture-conditioning the heat treated film at a temperature in the range of about 30° C. to 90° C. and at 70 to 100% relative humidity for about 1 to 5 minutes, and heat treating the thusly treated film at a temperature in the range of about 35° C. to 80° C. to smooth the film and to reduce the film water content to about the equilibrium amount.

References Cited in the file of this patent
UNITED STATES PATENTS

| | | |
|---|---|---|
| 1,979,762 | O'Kane et al. | Nov. 6, 1934 |
| 2,206,850 | Parsons | July 2, 1940 |
| 2,323,383 | Dreyfus | July 6, 1943 |
| 2,610,360 | Cline et al. | Sept. 16, 1952 |
| 2,698,967 | Reichel et al. | Jan. 11, 1955 |
| 2,745,134 | Collins | May 15, 1956 |
| 2,767,435 | Alles | Oct. 23, 1956 |
| 2,893,053 | Powell | July 7, 1959 |